United States Patent
You et al.

(10) Patent No.: US 10,231,198 B2
(45) Date of Patent: Mar. 12, 2019

(54) METHOD AND USER EQUIPMENT FOR RECEIVING DOWNLINK SIGNAL, AND METHOD AND BASE STATION FOR TRANSMITTING DOWNLINK SIGNAL

(71) Applicant: LG ELECTRONICS INC., Seoul (KR)

(72) Inventors: Hyangsun You, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 50 days.

(21) Appl. No.: 15/297,939

(22) Filed: Oct. 19, 2016

(65) Prior Publication Data
US 2017/0289965 A1   Oct. 5, 2017

Related U.S. Application Data

(60) Provisional application No. 62/315,676, filed on Mar. 31, 2016.

(51) Int. Cl.
| | | |
|---|---|---|
| H04W 72/04 | (2009.01) | |
| H04W 56/00 | (2009.01) | |
| H04L 5/00 | (2006.01) | |
| H04W 16/14 | (2009.01) | |
| H04W 48/12 | (2009.01) | |
| H04W 52/02 | (2009.01) | |

(52) U.S. Cl.
CPC .......... *H04W 56/001* (2013.01); *H04L 5/00* (2013.01); *H04W 16/14* (2013.01); *H04W 48/12* (2013.01); *H04W 52/02* (2013.01); *H04W 72/04* (2013.01)

(58) Field of Classification Search
None
See application file for complete search history.

(56) References Cited

U.S. PATENT DOCUMENTS

| | | | |
|---|---|---|---|
| 2017/0135052 A1* | 5/2017 | Lei | H04W 56/001 |
| 2017/0180095 A1* | 6/2017 | Xue | H04L 5/0048 |
| 2017/0187488 A1* | 6/2017 | Rico Alvarino | H04L 1/0041 |

(Continued)

FOREIGN PATENT DOCUMENTS

| | | | | |
|---|---|---|---|---|
| WO | WO 2017134626 | * | 8/2017 | |
| WO | WO 2017/134626 | * | 10/2017 | H04L 5/00 |

OTHER PUBLICATIONS

3GPP TSG-RAN WG1 #83, Nov. 15-22, 2015; Anaheim, California USA; Ericsson "NB-IOT—DL Design".*

(Continued)

*Primary Examiner* — Kodzovi Acolatse
(74) *Attorney, Agent, or Firm* — Lee Hong Degerman Kang Waimey

(57) ABSTRACT

Disclosed herein is a method and apparatus for transmitting/receiving a signal in a wireless communication system supporting NB-IoT. An eNB provides a user equipment (UE), for which NB-IoT is not configured, with information about frequency bands (anchor RBs) possibly having a synchronization signal for NB-IoT (hereinafter, an NB-IoT SS). When the eNB transmits a downlink signal to the UE, it may puncture the downlink signal on an RB having the NB-IoT SS, based on the information. When the UE transmits an uplink signal, it may puncture the uplink signal on an RB having the NB-IoT SS, based on the information.

6 Claims, 8 Drawing Sheets

(56) References Cited

U.S. PATENT DOCUMENTS

2017/0238292 A1* 8/2017 Rico Alvarino .... H04W 72/044
                                                          370/329
2017/0265169 A1* 9/2017 Chen .................. H04W 72/042
2017/0265171 A1* 9/2017 Rico Alvarino ...... H04L 5/0048

OTHER PUBLICATIONS

3GPP TSG RAN WG1 Meeting #83 R1-156693 Anaheim, USA, Nov. 15-22, 2015 Sony "Coexistence of eMTC and NB-IoT".*
3GPP TSG RAN WG1 Meeting #83 Anaheim, USA, Nov. 15-22, 2015, "Coexistence of eMTC and NB-IoT", Sony.*

* cited by examiner

METHOD AND USER EQUIPMENT FOR RECEIVING DOWNLINK SIGNAL, AND METHOD AND BASE STATION FOR TRANSMITTING DOWNLINK SIGNAL

CROSS-REFERENCE TO RELATED APPLICATIONS

Pursuant to 35 U.S.C. § 119(e), this application claims the benefit of U.S. Provisional Patent Application No. 62/315,676, filed on Mar. 31, 2016, the contents of which are hereby incorporated by reference herein in their entirety.

TECHNICAL FIELD

The present invention relates to a wireless communication system, and more particularly, to a method and apparatus for transmitting/receiving a downlink signal.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

In addition, with development of smart devices, a new method of efficiently transmitting/receiving a small amount of data or data generated with low frequency is demanded.

The technical objects that can be achieved through the present invention are not limited to what has been particularly described hereinabove and other technical objects not described herein will be more clearly understood by persons skilled in the art from the following detailed description.

SUMMARY

Provided herein is a method and apparatus for transmitting/receiving a signal in a wireless communication system supporting NB-IoT. An eNB provides a user equipment (UE), for which NB-IoT is not configured, with information about frequency bands (anchor RBs) possibly having a synchronization signal for NB-IoT (hereinafter, an NB-IoT SS). When the eNB transmits a downlink signal to the UE, it may assume, based on the information, that the downlink signal is punctured on an RB having the NB-IoT SS. When the UE transmits an uplink signal, it may puncture the uplink signal on an RB having the NB-IoT SS, based on the information.

To achieve these objects and other advantages and in accordance with the purpose of the invention, as embodied and broadly described herein, a method of receiving a downlink signal at a user equipment in a wireless communication system is provided. The method may include receiving narrowband IoT (NB-IoT) anchor physical resource block (PRB) information indicating PRBs (NB-IoT anchor PRBs) where an NB-IoT synchronization signal (SS) can be present, receiving frequency resource information indicating a frequency resource to which the downlink signal is mapped, and receiving the downlink signal using the frequency resource based on the frequency resource information. When the frequency resource includes a first PRB used as a first NB-IoT anchor PRB indicated by the NB-IoT anchor PRB information, and a subframe having the downlink signal is a first NB-IoT SS subframe having an SS of the first NB-IoT anchor PRB, it may be assumed that a portion of the downlink signal mapped to the first PRB in the downlink signal mapped to the frequency resource is not received in the first NB-IoT SS subframe.

In another aspect of the present invention, a method of transmitting a downlink signal at a base station in a wireless communication system is provided. The method may include transmitting narrowband IoT (NB-IoT) anchor physical resource block (PRB) information indicating PRBs (NB-IoT anchor PRBs) where an NB-IoT synchronization signal (SS) can be present, transmitting frequency resource information indicating a frequency resource to which the downlink signal is mapped, and transmitting the downlink signal using the frequency resource based on the frequency resource information. When the frequency resource includes a first PRB used as a first NB-IoT anchor PRB indicated by the NB-IoT anchor PRB information, and a subframe having the downlink signal is a first NB-IoT SS subframe having an SS of the first NB-IoT anchor PRB, a portion of the downlink signal mapped to the first PRB in the downlink signal mapped to the frequency resource may not be transmitted in the first NB-IoT SS subframe.

In another aspect of the present invention, a user equipment for receiving a downlink signal in a wireless communication system is provided. The user equipment includes a radio frequency (RF) unit, and a processor configured to control the RF unit. The processor may be configured to control the RF unit to receive narrowband IoT (NB-IoT) anchor physical resource block (PRB) information indicating PRBs (NB-IoT anchor PRBs) where an NB-IoT synchronization signal (SS) can be present, control the RF unit to receive frequency resource information indicating a frequency resource to which the downlink signal is mapped, and control the RF unit to receive the downlink signal using the frequency resource based on the frequency resource information. When the frequency resource includes a first PRB used as a first NB-IoT anchor PRB indicated by the NB-IoT anchor PRB information, and a subframe having the downlink signal is a first NB-IoT SS subframe having an SS of the first NB-IoT anchor PRB, the processor may assume that a portion of the downlink signal mapped to the first PRB in the downlink signal mapped to the frequency resource is not transmitted in the first NB-IoT SS subframe.

In another aspect of the present invention, a base station for transmitting a downlink signal in a wireless communication system is provided. The base station includes a radio frequency (RF) unit, and a processor configured to control the RF unit. The processor may be configured to control the RF unit to transmit narrowband IoT (NB-IoT) anchor physical resource block (PRB) information indicating PRBs (NB-IoT anchor PRBs) where an NB-IoT synchronization signal (SS) can be present, control the RF unit to transmit frequency resource information indicating a frequency resource to which the downlink signal is mapped, and control the RF unit to transmit the downlink signal using the frequency resource based on the frequency resource information. When the frequency resource includes a first PRB used as a first NB-IoT anchor PRB indicated by the NB-IoT anchor PRB information, and a subframe having the downlink signal is a first NB-IoT SS subframe having an SS of the first NB-IoT anchor PRB, the processor may control the RF unit not to transmit, in the first NB-IoT SS subframe, a portion of the downlink signal mapped to the first PRB in the downlink signal mapped to the frequency resource.

In the respective aspects of the present invention, when the frequency resource further includes a second PRB used as a second NB-IoT anchor PRB indicated by the NB-IoT anchor PRB information, the second PRB being different from the first PRB, and a subframe having the downlink signal is a second NB-IoT SS subframe having an SS of the second NB-IoT anchor PRB, a portion of the downlink signal mapped to the second PRB in the downlink signal mapped to the frequency resource may not be transmitted in the second NB-IoT SS subframe. The second PRB may be non-contiguous with the first PRB.

In the respective aspects of the present invention, the downlink signal may be mapped to the frequency resource in each of a plurality of subframes. The downlink signal including the portion mapped to the first PRB may be transmitted in a subframe not corresponding to the first NB-IoT SS subframe among the plurality of subframes.

In the respective aspects of the present invention, the method may further include transmitting time resource information indicating the plurality of subframes for the downlink signal.

In the respective aspects of the present invention, the downlink signal may not be an NB-IoT downlink signal.

According to an embodiment of the present invention, wireless communication signals may be efficiently transmitted/received. Thereby, the overall throughput of the wireless communication system may be improved.

According to an embodiment of the present invention, a low-complexity/low-cost user equipment may communicate with a base station, while maintaining compatibility with the existing system.

According to an embodiment of the present invention, a user equipment may be implemented at low complexity/low cost.

According to an embodiment of the present invention, a user equipment and an eNB may communicate with each other in a narrowband.

According to an embodiment of the present invention, a small amount of data may be efficiently transmitted/received.

BRIEF DESCRIPTION OF THE DRAWING

The accompanying drawings, which are included to provide a further understanding of the invention, illustrate embodiments of the invention and together with the description serve to explain the principle of the invention.

DETAILED DESCRIPTION

Figure 1:
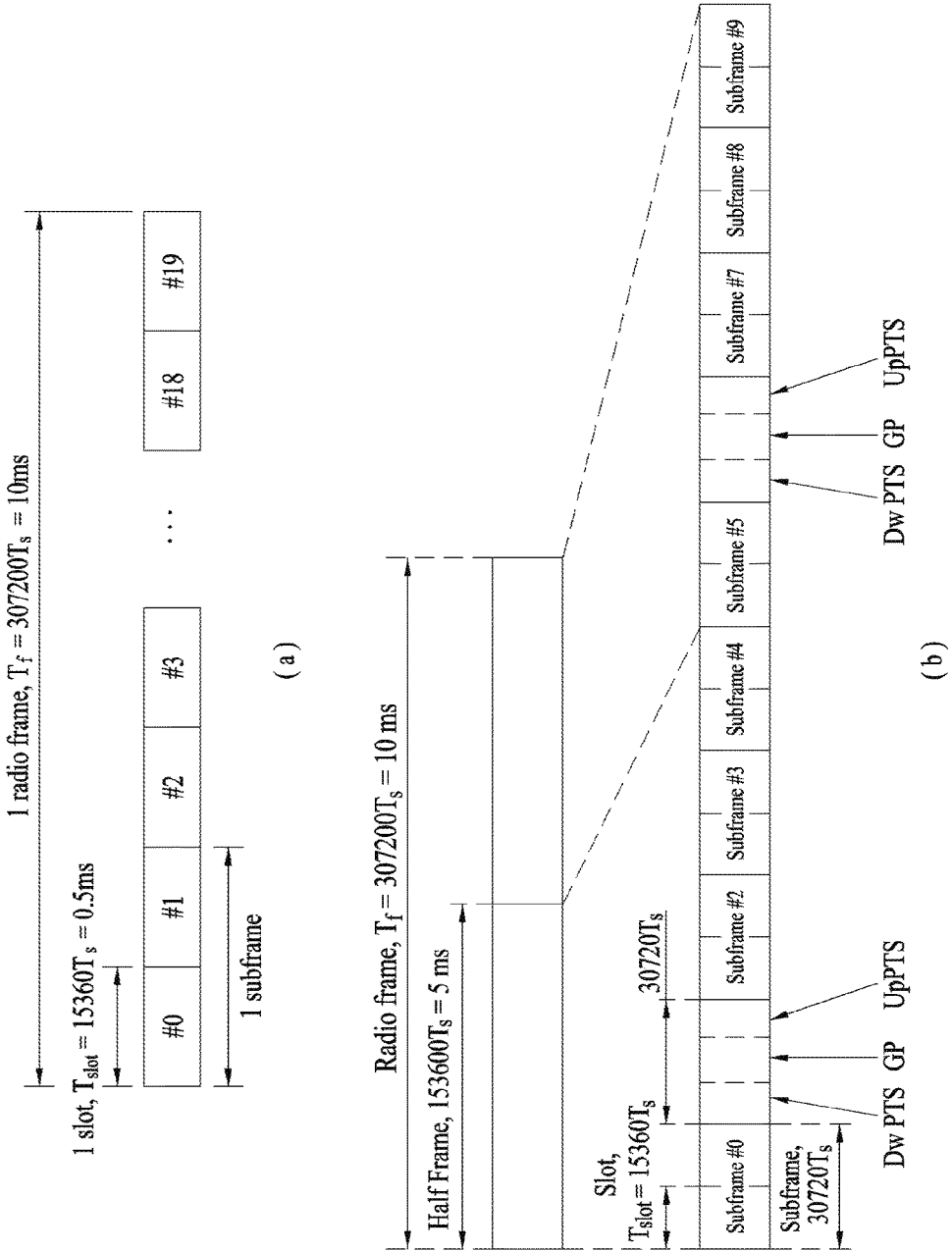
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna. The node may also be referred to as a point.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (HACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, referring to FIGS. 1 and 4, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE/LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

TABLE 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In TABLE 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. TABLE 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | | |

Figure 2:
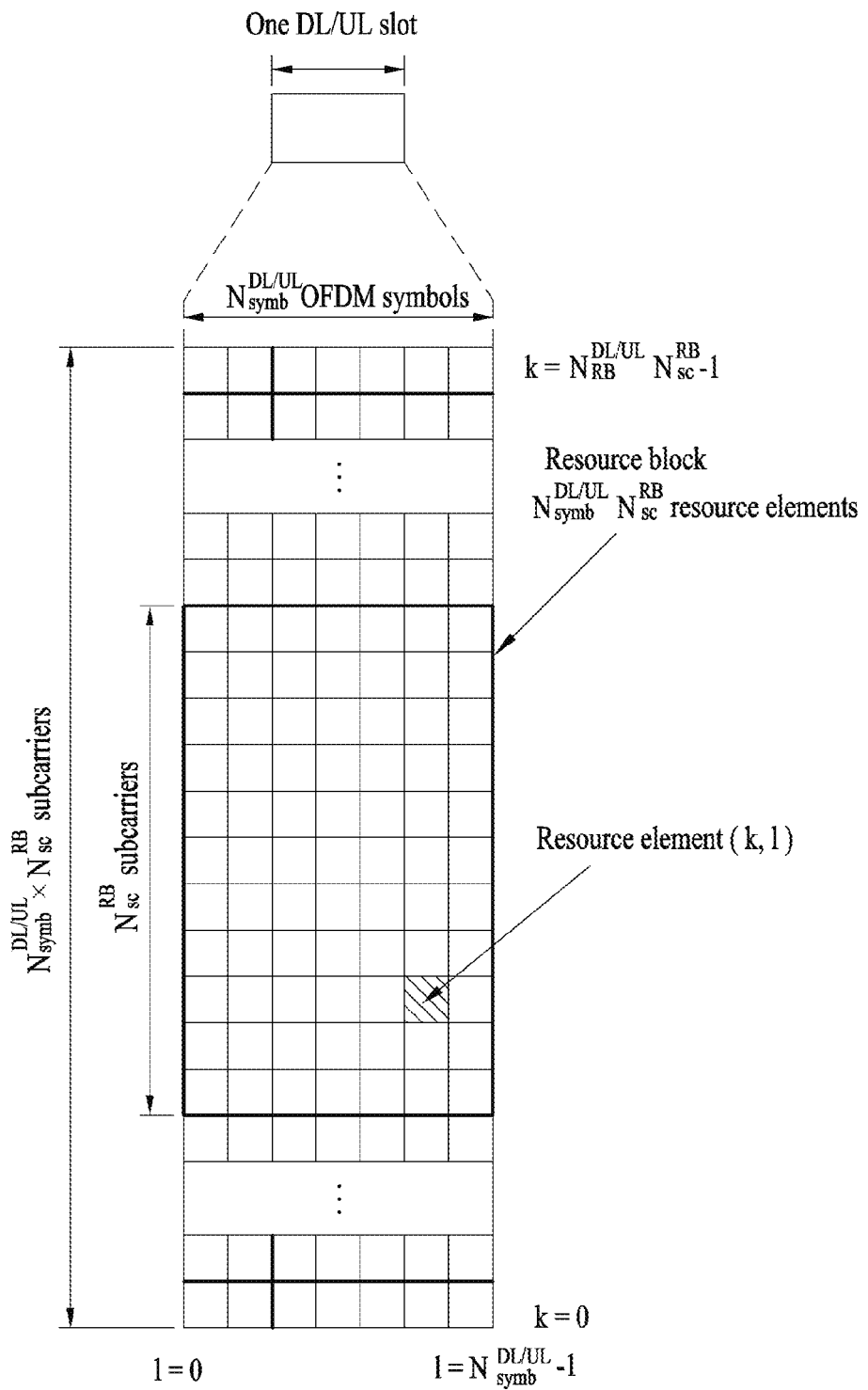
FIG. 2 illustrates the structure of a downlink (DL)/uplink (UL) slot in a wireless communication system.

FIG. 2 illustrates the structure of a DL/UL slot structure in a wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
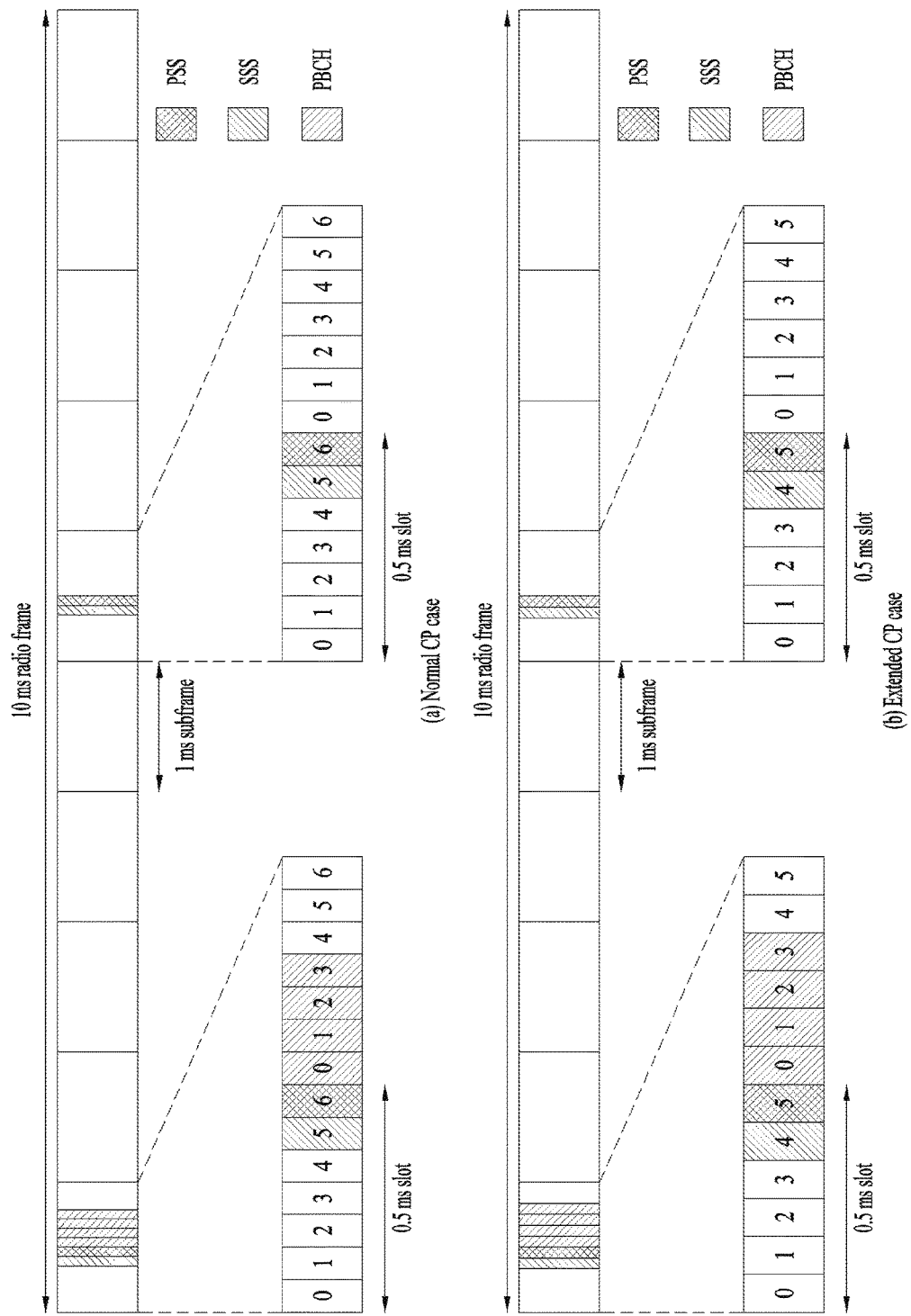
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

Upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

Upon determining the time and frequency parameters which are needed to perform demodulation of a DL signal and transmission of a UL signal at the exact time by performing the cell search procedure using a PSS/SSS, the UE may need to acquire system information necessary for system configuration of the UE from the eNB to communicate with the eNB.

The system information is configured by a master information block (MIB) and system information blocks (SIBs). Each SIB includes a set of parameters functionally associated with each other, and the SIBs may be divided into a master information block (MIB), system information block type 1 (SIB1), system information block type 2 (SIB2), and SIB 3 to SIB10, according to the parameters they include.

The MIB includes parameters which are essential to initial access to a network and are most frequently transmitted. The UE may receive the MIB over a broadcast channel (e.g., PBCH). The MIB includes a DL bandwidth (DL BW), PHICH configuration, and system frame number (SFN). Accordingly, upon receiving the PBC, the UE may explicitly recognize information about the DL BW, SFN, and PHICH configuration. Information which the UE may implicitly recognize through the received PBCH may include the number of transmit antenna ports of the eNB. The information about the number of transmit antennas of the eNB is implicitly signaled by masking the 16-bit cyclic redundancy check (CRC) used for error detection in the PBCH with a sequence corresponding to the number of transmit antennas (e.g., XOR operation).

SIB1 contains information relevant when evaluating if a UE is allowed to access a cell and defines the scheduling of other SIBs. SIB1 is received by the UE through broadcast signaling or dedicated signaling.

A DL carrier frequency and a corresponding system bandwidth may be acquired by the MIB carried by the PBCH. A UL subcarrier frequency and a corresponding system bandwidth may be obtained through system information, which is a DL signal. If the MIB received by the UE does not have valid system information stored for a corresponding cell, the UE applies the value of DL BW in the MIB to the UL BW until system information block 2 (SIB2) is received. For example, the UE may acquire SIB2 and recognize the entire UL system band that the UE is allowed to use for UL transmission, through the UL-carrier frequency and UL BW information in the SIB2.

In the frequency domain, the PSS/SSS and PBCH are transmitted only within 6 RBs, which are 3 RBs on the left side of a DC subcarrier and 3 RBs on right side of the DC subcarrier, namely 72 subcarriers within the corresponding OFDM symbol irrespective of the actual system bandwidth. Accordingly, the UE is configured to detect or decode the SS and PBCH irrespective of the DL transmission bandwidth configured for the UE.

The UE having finished initial cell search may perform the random access procedure to complete access to the eNB. To this end, the UE may transmit a preamble through a physical random access channel (PRACH), and receive a response message which is a response to the preamble through a PDCCH and PDSCH. In the case of contention-based random access, transmission of an additional PRACH and a contention resolution procedure for the PDCCH and a PDSCH corresponding to the PDCCH may be performed.

After performing the procedure described above, the UE may perform PDCCH/PDSCH reception and PUSCH/PUCCH transmission as a typical procedure of transmission of an uplink/downlink signal The random access procedure is also referred to as a random access channel (RACH) procedure. The random access procedure is used for various purposes including initial access, adjustment of uplink synchronization, resource assignment, and handover. Random access procedures are classified into a contention-based procedure and a dedicated (i.e., non-contention-based) procedure. The contention-based random access procedure is used for general operations including initial access, while the dedicated random access procedure is used for limited operations such as handover. In the contention-based random access procedure, the UE randomly selects a RACH preamble sequence. Accordingly, it is possible that multiple UEs transmit the same RACH preamble sequence at the same time. Thereby, a contention resolution procedure needs to be subsequently performed. On the other hand, in the dedicated random access procedure, the UE uses an RACH preamble sequence that the eNB uniquely allocates to the UE. Accordingly, the random access procedure may be performed without contention with other UEs.

The contention-based random access procedure includes the following four steps. Messages transmitted in Steps 1 to 4 given below may be referred to as Msg 1 to Msg 4.
Step 1: RACH preamble (via PRACH) (from UE to eNB)
Step 2: Random access response (RAR) (via PDCCH and PDSCH) (from eNB to UE)
Step 3: Layer 2/layer 3 message (via PUSCH) (from UE to eNB)
Step 4: Contention resolution message (from eNB to UE)
The dedicated random access procedure includes the following three steps. Messages transmitted in Steps 0 to 2 may be referred to as Msg0 to Msg2, respectively. Uplink transmission (i.e., Step 3) corresponding to the RAR may also be performed as a part of the random access procedure. The dedicated random access procedure may be triggered using a PDCCH for ordering transmission of an RACH preamble (hereinafter, a PDCCH order).

Step 0: RACH preamble assignment (from eNB to UE) through dedicated signaling
Step 1: RACH preamble (via PRACH) (from UE to eNB)
Step 2: RAR (via PDCCH and PDSCH) (from eNB to UE)

After transmitting the RACH preamble, the UE attempts to receive a random access response (RAR) within a preset time window. Specifically, the UE attempts to detect a PDCCH with RA-RNTI (Random Access RNTI) (hereinafter, RA-RNTI PDCCH) (e.g., CRC is masked with RA-RNTI on the PDCCH) in the time window. In detecting the RA-RNTI PDCCH, the UE checks the PDSCH for presence of an RAR directed thereto. The RAR includes timing advance (TA) information indicating timing offset information for UL synchronization, UL resource allocation information (UL grant information), and a random UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

In physical layer, A random access preamble, i.e., RACH preamble consists of a cyclic prefix of length $T_{CP}$ and a sequence part of length $T_{SEQ}$. $T_{SEQ}$ of $T_{CP}$ depends on the frame structure and the random access configuration. The preamble format is controlled by a higher layer. The following table shows examples of $T_{SEQ}$ of $T_{CP}$.

TABLE 3

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2.24576 \cdot T_s$ |
| 3 | $21024 \cdot T_s$ | $2.24576 \cdot T_s$ |
| 4(see NOTE) | $448 \cdot T_s$ | $4096 \cdot T_s$ |

NOTE:
Frame structure type 2 and special subframe configuration with UpPTS lengths $4384 \cdot T_s$ and $5120 \cdot T_s$ only.

A random access preamble is transmitted in a UL subframe. The transmission of a random access preamble is restricted to certain time and frequency resources. These resources are referred to as PRACH resources, and enumerated in increasing order of the subframe number within the radio frame and the physical resource blocks in the frequency domain such that index 0 correspond to the lowest numbered physical resource block and subframe within the radio frame. PRACH resources within the radio frame are indicated by a PRACH resource index.

For frame structure type 1 with preamble format 0-3, there is at most one random access resource per subframe. The following table shows examples of preamble formats and subframes in which transmission of the random access preamble is allowed for a configuration given in frame structure type 1. The PRACH configuration is given by a higher layer signal (transmitted by the eNB).

TABLE 4

| PRACH Configuration Index | Preamble Format | SFN | Subframe number | PRACH Configuration Index | Preamble Format | SFN | Subframe number |
|---|---|---|---|---|---|---|---|
| 0 | 0 | Even | 1 | 32 | 2 | Even | 1 |
| 1 | 0 | Even | 4 | 33 | 2 | Even | 4 |
| 2 | 0 | Even | 7 | 34 | 2 | Even | 7 |
| 3 | 0 | Any | 1 | 35 | 2 | Any | 1 |
| 4 | 0 | Any | 4 | 36 | 2 | Any | 4 |
| 5 | 0 | Any | 7 | 37 | 2 | Any | 7 |
| 6 | 0 | Any | 1, 6 | 38 | 2 | Any | 1, 6 |
| 7 | 0 | Any | 2, 7 | 39 | 2 | Any | 2, 7 |
| 8 | 0 | Any | 3, 8 | 40 | 2 | Any | 3, 8 |
| 9 | 0 | Any | 1, 4, 7 | 41 | 2 | Any | 1, 4, 7 |
| 10 | 0 | Any | 2, 5, 8 | 42 | 2 | Any | 2, 5, 8 |
| 11 | 0 | Any | 3, 6, 9 | 43 | 2 | Any | 3, 6, 9 |
| 12 | 0 | Any | 0, 2, 4, 6, 8 | 44 | 2 | Any | 0, 2, 4, 6, 8 |
| 13 | 0 | Any | 1, 3, 5, 7, 9 | 45 | 2 | Any | 1, 3, 5, 7, 9 |
| 14 | 0 | Any | 0, 1, 2, 3, 4, 5, 6, 7, 8, 9 | 46 | N/A | N/A | N/A |
| 15 | 0 | Even | 9 | 47 | 2 | Even | 9 |
| 16 | 1 | Even | 1 | 48 | 3 | Even | 1 |
| 17 | 1 | Even | 4 | 49 | 3 | Even | 4 |
| 18 | 1 | Even | 7 | 50 | 3 | Even | 7 |
| 19 | 1 | Any | 1 | 51 | 3 | Any | 1 |
| 20 | 1 | Any | 4 | 52 | 3 | Any | 4 |
| 21 | 1 | Any | 7 | 53 | 3 | Any | 7 |
| 22 | 1 | Any | 1, 6 | 54 | 3 | Any | 1, 6 |
| 23 | 1 | Any | 2, 7 | 55 | 3 | Any | 2, 7 |
| 24 | 1 | Any | 3, 8 | 56 | 3 | Any | 3, 8 |
| 25 | 1 | Any | 1, 4, 7 | 57 | 3 | Any | 1, 4, 7 |
| 26 | 1 | Any | 2, 5, 8 | 58 | 3 | Any | 2, 5, 8 |
| 27 | 1 | Any | 3, 6, 9 | 59 | 3 | Any | 3, 6, 9 |
| 28 | 1 | Any | 0, 2, 4, 6, 8 | 60 | N/A | N/A | N/A |
| 29 | 1 | Any | 1, 3, 5, 7, 9 | 61 | N/A | N/A | N/A |
| 30 | N/A | N/A | N/A | 62 | N/A | N/A | N/A |
| 31 | 1 | Even | 9 | 63 | 3 | Even | 9 |

In Table 4, SFN denotes a system frame number.

The first PRB $n^{RA}_{PRB}$ allocated to the PRACH opportunity considered for preamble formats 0, 1, 2 and 3 is defined as $n^{RA}_{PRB}=n^{RA}_{PRBoffset}$, where the PRACH frequency offset, $n^{RA}_{PRBoffset}$ is expressed as a PRB number configured by higher layers and fulfilling $0 \leq n^{RA}_{PRBoffset} \leq N^{UL}_{RB}-6$.

For frame structure type 2 with preamble formats 0-4, there might be multiple random access resources in an UL subframe (or UpPTS for preamble format 4) depending on the UL/DL configuration. Random access resources for frame structure type 2 are defined according to PRACH configuration indexes (see 3GPP TS 36.211).

Figure 4:
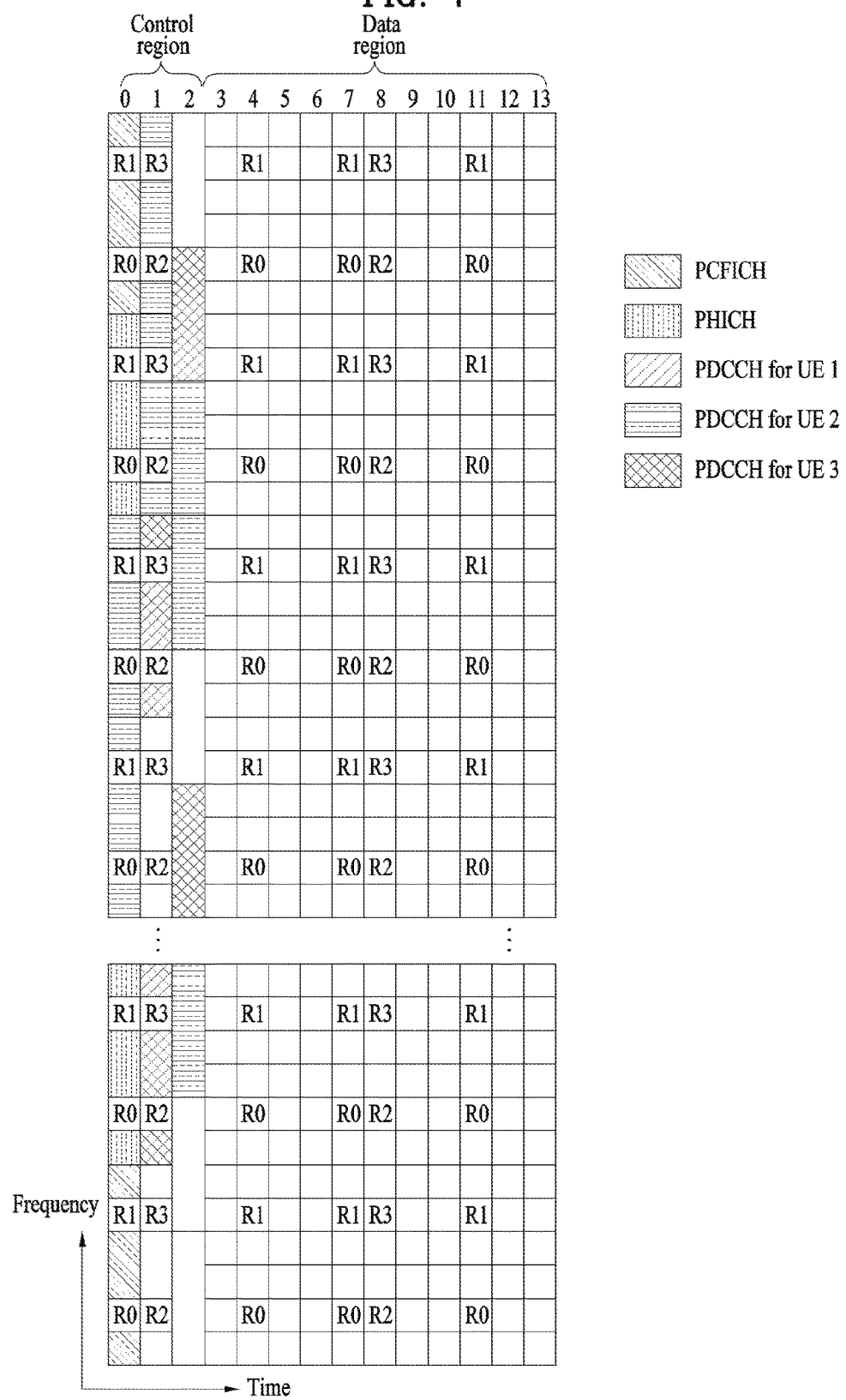
FIG. 4 illustrates the structure of a DL subframe used in a wireless communication system.

FIG. 4 illustrates the structure of a DL subframe used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PC-FICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs. A set of OFDM symbols available for the PDCCH at a subframe is given by the following Table.

TABLE 5

| Subframe | Number of OFDM symbols for PDCCH when $N^{DL}_{RB} > 10$ | Number of OFDM symbols for PDCCH when $N^{DL}_{RB} \leq 10$ |
|---|---|---|
| Subframe 1 and 6 for frame structure type 2 | 1, 2 | 2 |
| MBSFN subframes on a carrier supporting PDSCH, configured with 1 or 2 cell-specfic antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by TABLE 5. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB}>10$, the number 1, 2 or 3 of OFDM symbols which are spans of DCI carried by the PDCCH is given by the CFI. For a downlink system bandwidth $N^{DL}_{RB}\leq 10$, the number 2, 3 or 4 of OFDM symbols which are spans of DCI carried by the PDCCH is given by CFI+1. The CFI is coded in accordance with the following Table.

TABLE 6

| CFI | CFI code word $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

For example, a transmission mode is semi-statically configured for the UE to allow the UE to receive a PDSCH which is transmitted according to one of a plurality of predefined transmission modes. The UE attempts to decode the PDCCH using only DCI formats corresponding to the transmission mode thereof. In other words, in order to maintain the computational load of the UE according to an attempt of blind decoding at a level lower than or equal to a certain level, not all DCI formats are simultaneously searched by the UE.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS).

An individual resource on which the PDCCH can be transmitted in the SS is called a PDCCH candidate. A set of PDCCH candidates that the UE is to monitor is defined in terms of SSs, where a search space $S^{(L)}_k$ at aggregation level $L \in \{1, 2, 4, 8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 5:
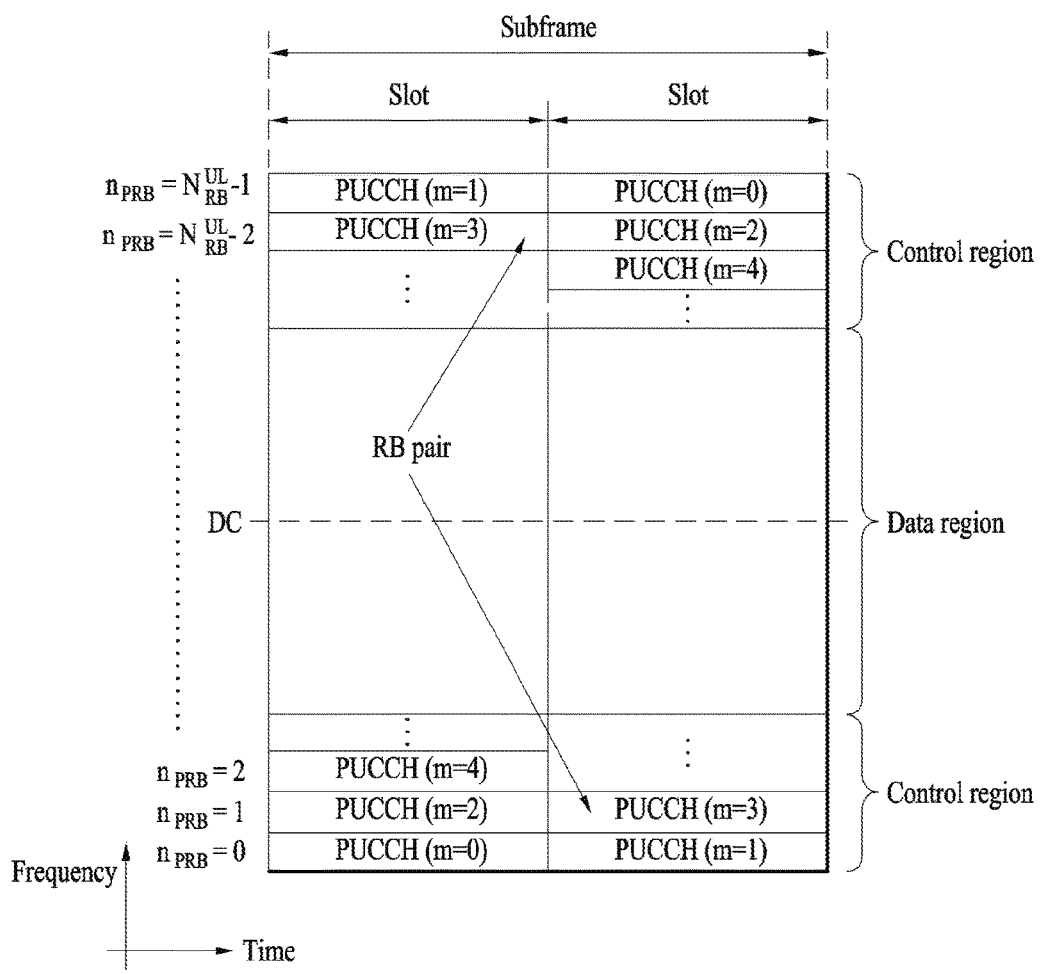
FIG. 5 illustrates the structure of a UL subframe used in a wireless communication system.

FIG. 5 illustrates the structure of a UL subframe used in a wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs may be aggregated on each of a UL and a DL to support a bandwidth of 60 MHz. The respective CCs may be contiguous or non-contiguous in the frequency domain. For convenience, although it has been described that the bandwidth of UL CC and the bandwidth of DL CC are the same as each other and symmetric to each other, the bandwidth of each CC may be independently determined. Asymmetrical carrier aggregation in which the number of UL CCs is different from the number of DL CCs may be implemented. DL/UL CC limited to a specific UE may be referred to as a serving UL/DL CC configured for the specific UE.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

A configured cell refers to a cell in which carrier aggregation is performed for a UE based on measurement report from another eNB or UE among cells of an eNB and is configured per UE. The cell configured for the UE may be a serving cell in terms of the UE. For the cell configured for the UE, i.e. the serving cell, resources for ACK/NACK transmission for PDSCH transmission are reserved in advance. An activated cell refers to a cell configured to be actually used for PDSCH/PUSCH transmission among cells configured for the UE and CSI reporting and SRS transmission for PDSCH/PUSCH transmission are performed in the activated cell. A deactivated cell refers to a cell configured not to be used for PDSCH/PUSCH transmission by the command of an eNB or the operation of a timer and, if a cell is deactivated, CSI reporting and SRS transmission are also stopped in the cell.

For reference, a carrier indicator (CI) denotes a serving cell index (ServCellIndex), CI=0 is applied to Pcell. The serving cell index is a short ID used to identify a serving cell. For example, any one of integers from 0 to 'maximum number of carrier frequencies which can be configured for the UE at a time —1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

An EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port $p \in \{107, 108, 109, 110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

Figure 6:
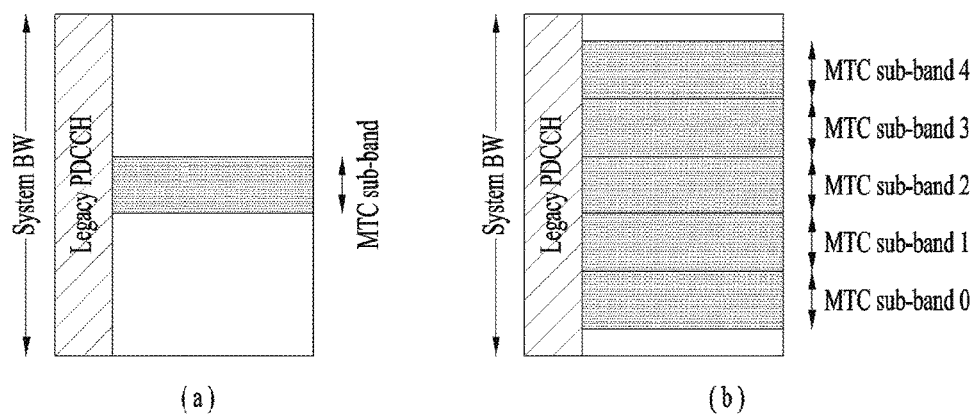
FIG. 6 illustrates an exemplary signal band for MTC.

FIG. 6 illustrates an exemplary signal band for MTC.

As one method of reducing the cost of an MTC UE, the MTC UE may operate in, for example, a reduced UE DL and UL bandwidths of 1.4 MHz regardless of the system bandwidth when the cell operates. In this case, a sub-band (i.e., narrowband) in which the MTC UE operates may always be positioned at the center of a cell (e.g., 6 center PRBs) as shown in FIG. 6 (a), or multiple sub-bands for MTC may be provided in one subframe to multiplex MTC UEs in the subframe such that the UEs use different sub-bands or use the same sub-band which is not a sub-band consisting of the 6 center PRBs.

In this case, the MTC UE may not normally receive a legacy PDCCH transmitted through the entire system bandwidth, and therefore it may not be preferable to transmit a PDCCH for the MTC UE in an OFDM symbol region in which the legacy PDCCH is transmitted, due to an issue of multiplexing with a PDCCH transmitted for another UE. As one method to address this issue, introduction of a control channel transmitted in a sub-band in which MTC operates for the MTC UE is needed. As a DL control channel for such low-complexity MTC UE, a legacy EPDCCH may be used. Alternatively, an M-PDCCH, which is a variant of the legacy PDCCH/EPDCCH, may be introduced for the MTC UE.

A data channel (e.g., PDSCH, PUSCH) and/or control channel (e.g., M-PDCCH, PUCCH, PHICH) may be transmitted through multiple subframes to implement coverage enhancement (CE) of the UE, using a repetition technique or TTI bundling technique. On behalf of the CE, a control/data channel may be transmitted additionally using techniques such as cross-subframe channel estimation and frequency (narrowband) hopping. Herein, the cross-subframe channel estimation refers to a channel estimation technique using not only a reference signal in a subframe having a corresponding channel but also a reference signal in neighboring subframe(s).

The MTC UE may need CE up to, for example, 15 dB. However, not all MTC UEs are present in an environment which requires CE. In addition, the QoS requirements for MTC UEs are not identical. For example, devices such as a sensor and a meter have a low mobility and a small amount of data to transmit/receive and are very likely to be positioned in a shaded area. Accordingly, such devices may need high CE. On the other hand, wearable devices such as a smart watch may have mobility and are very likely to have a relatively large amount of data to transmit/receive and to be positioned in a place other than the shaded area. Accordingly, not all MTC UEs need a high level of CE, and the required capability may depend on the type of an MTC UE.

According to LTE-A Rel-13, CE may be divided into two modes. In a first mode (referred to as CE mode A), transmission may not be repeated or may be repeated only a few times. In a second mode (or CE mode B), many repetitions of transmission are allowed. A mode to enter between the two modes may be signaled to the MTC UE. Herein, parameters that a low-complexity/low-cost UE assumes for transmission/reception of a control channel/data channel may depend on the CE mode. In addition, the DCI format which the low-complexity/low-cost UE monitors may depend on the CE mode. Transmission of some physical channels may be repeated the same number of times regardless of whether the CE mode is CE mode A or CE mode B.

In the present invention, the eNB may configure repetition of transmission/reception of the PDCCH, PDSCH, PUCCH and/or PUSCH (hereinafter, PDCCH/PDSCH/PUCCH/PUSCH) for the MTC UE. For example, the eNB may provide the MTC UE with configuration information about a frequency resource and a time resource (e.g., subframes) having a repetition of PDCCH/PDSCH/PUCCH/PUSCH, the (maximum) number of repetitions, and/or a repetition start subframe. The eNB may repeat transmission of PDCCH/PDSCH by transmitting the PDCCH/PDSCH in each of a plurality of subframes according to the configuration information, and the UE may repeat reception of the PDCCH/PDSCH by receiving the PDCCH/PDSCH in each of a plurality of subframes according to the configuration information. The UE may repeat transmission of PUCCH/PUSCH by transmitting the PUCCH/PUSCH in each of a plurality of subframes according to the configuration information, and the eNB may repeat reception of the PUCCH/PUSCH by receiving PUCCH/PUSCH in each of a plurality of subframes according to the configuration information.

An LTE cell operates in a bandwidth of at least 6 RBs. To further reduce the cost of the MTC UE, an environment where the MTC UE operates in a narrow bandwidth of about 200 kHz may be taken into consideration. Such MTC UE, namely an MTC UE capable of operating only within a narrow bandwidth, may operate with backward compatibility in a legacy cell having a bandwidth wider than 200 kHz. A clean frequency band which does not have the legacy cell may be deployed only for such MTC UE.

In the present invention, a system operating through a narrowband of about one PRB within a legacy cell having a bandwidth wider than 200 kHz is referred to as in-band NB (narrowband) IoT (Internet of things). In particular, a system operating through a narrowband of about one PRB only for the MTC UE in a clean frequency band which does not have the legacy cell is referred to as a stand-alone NB IoT. IoT refers to internetworking of electronics, software, sensors, actuators, physical devices having a network connectivity, connected devices, smart devices, buildings and other items, which enables corresponding objects to collect and exchange data. In other words, IoT refers to a network of physical objects, machines, humans and other devices, which enables connectivity communication for exchange of data for IoT intelligent applications and services. IoT allows objects to remotely perform the sensing and control operations through existing network infrastructure, thereby providing opportunities for direct integration between the physical world and the digital world, which leads to improved efficiency, accuracy and economic benefits. In particular, IoT employing the 3GPP technology is referred to as cellular IoT (CIoT)

NB-IoT allows access to network services through E-UTRA having a limited channel bandwidth of 180 kHz. NB-IoT may be considered as IoT operating on a PRB-by-PRB basis.

To specify a radio access for CIoT, based to a great extent on a non-backward-compatible variant of E-UTRA, following characteristics can be addressed:
improved indoor coverage,
support for massive number of low throughput devices,
low delay sensitivity, ultra low device cost,
low device power consumption and (optimised) network architecture.

In the following description, a radio resource with the size of one RB operating for NB-IoT will be referred to as an NB-IoT cell or NB-LTE cell, and a system supporting an NB-IoT cell operating on one RB will be referred to as an NB-IoT system or NB-LTE system.

In addition, an LTE radio resource on which communication is performed according to the LTE system will be referred to as an LTE cell, and a GSM radio resource on which communication is performed according to the GSM system will be referred to as a GSM cell. An in-band NB IoT cell may operate with a bandwidth of 200 kHz (in consideration of a guard band) or 180 kHz (when the guard band is not considered) in the system bandwidth of an LTE cell.

The present invention proposes a method of providing, at the eNB, a service to a narrowband device having a narrowband RF capability while providing a service to a UE having a wideband RF capability in a wideband system. Herein, the wideband refers to a band which is at least 1.4 Mhz.

The present invention proposes a method of receiving a service at a narrowband device having a narrowband RF capability in a wideband LTE system, using the limited RF capability thereof while minimizing influence on wideband UEs. In the following description of the present invention, a UE supporting NB-IoT will be referred to as an NB-IoT UE or NB-LTE UE.

In embodiments of the present invention described below, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

The LTE system has the following two types of services/UEs for an MTC/IoT service.

MTC (BL/CE UE): A service/UE having reduced cost/power consumption and enhanced coverage has been introduced for the MTC service of the LTE/LTE-A. To this end, the following techniques have been introduced.
>Cost reduction
>>Single Rx/RF chain (Rel-12)
>>Peak rate reduction (Rel-12)
>>HD-FDD with single oscillator (Rel-12)
>>Bandwidth reduction (Rel-13)
>>Maximum UE transmit power (Rel-13)
>Reduced power consumption
>>New Power Save Mode (Rel-12)
>>Relaxed measurement (Rel-12, Rel-13)
>Coverage enhancement: ~15 dB
>>Repetition (Rel-13)
>>PSD boosting (Rel-13)
>>Relaxed requirement (Rel-13)

Herein, the bandwidth of the MTC UE has been reduced to 6 RBs. This UE is generally called a bandwidth limited (BL)/coverage enhanced (CE) UE.

NB-IoT (NB-IoT UE): A service/UE operating based on the in-band/guard-band operation and stand-alone operation of the LTE/LTE-A cell is introduced for the cellular IoT service, targeting further lowering cost/power consumption than in MTC. To this end, the following techniques are considered along with the techniques considered for MTC.
>Bandwidth reduction (targeting 180 kHz)
>New modulation scheme/RS design for peak-to-average power ratio (PAPR) reduction
>Multi/single-tone transmission for PSD boosting
>TTI extension to multiple subframes The present invention proposes various multiplexing schemes for a case when an MTC UE (BL/LC UE) and an NB-IoT UE operate together in the same cell.

When a UE attempts initial access to an LTE system, the UE first receives a synchronization signal which the eNB periodically transmits. In the LTE system, the eNB transmits a PSS/SSS over 6 center RBs (namely, 1.08 MHz) of the system band. Although the PSS/SSS is transmitted over the 6 RBs, the center frequency of the 6 RBs having the PSS/SSS should be positioned at frequencies which are multiples of 100 kHz. A UE performing cell search will search for the PSS/SSS of the eNB at center frequencies corresponding to multiples of 100 kHz in units of 100 kHz. That is, to facilitate initial cell search of the UE, the DL center frequencies of the LTE system may be positioned only at multiples of 100 kHz in the entire available frequency band. These are called a frequency raster or channel raster. If the channel raster of the UE is 100 kHz, the UE attempts to detect a synchronization signal in units of 100 kHz in a given frequency band. For example, if the channel raster is defined as 100 kHz, the center frequency may be positioned only at the following frequencies.

$$F_c = F_o + m \cdot 100 \text{ kHz} \qquad \text{EQUATION 11}$$

Herein, m is an integer, and Fc is a center frequency. Fo may be a frequency at which a frequency band allowing operation of the LTE system begins or a reference frequency which is used when the UE begins to search for center frequencies in a frequency band allowing operation of the LTE system. Alternatively, Fo may mean the middle of the LTE system, namely the EUTRA system. If the channel raster is defined as 100 kHz, the center frequency may be positioned only in units of 100 kHz. According to Equation 1, the UE performs synchronization signal search in units of 100 kHz starting at a specific frequency Fo, and assumes that frequencies at which the synchronization signal of the system may be transmitted are present only in units of 100 kHz starting with Fo.

For the MTC UE, up to 6 RBs should be supported, and therefore the UE may search for the legacy PSS/SSS/PBCH transmitted on the 6 center RBs of the corresponding band. Accordingly, the MTC UE may search for the LTE/LTE-A cell according to the existing channel raster, and may access the corresponding LTE/LTE-A cell using the PSS/SSS/PBCH detected on the corresponding LTE/LTE-A cell.

The channel raster of the legacy LTE system is 100 kHz. Accordingly, in the NB-LTE system, the channel raster of 100 kHz may be maintained. Additionally, to minimize influence on the legacy LTE system, the subcarrier interval of 15 kHz used in the legacy LTE system may be maintained in the NB-IoT system. This is particularly the case when the NB-IoT system is operated in the band of the LTE system, namely in the in-band.

Hereinafter, for a channel used for the same purpose or similar purpose as a channel transmitted in the legacy wideband LTE system, "NB-" precedes the name of the legacy channel to distinguish the channel from the channel transmitted in the legacy LTE system. For example, a signal transmitted for the NB-LTE system is referred to as an NB-SS. As in the LTE system, the NB-SS may be subdivided into NB-PSS/NB-SSS so as to be transmitted, or may be transmitted without being divided into the NB-PSS and the NB-SSS. Similarly, for a PBCH which is essential for initial cell search, the PBCH transmitted in the NB-LTE system is referred to as an NB-PBCH. The basic transmission purpose and content of the NB-PSS/NB-SSS/NB-PBCH may be similar to those of the LTE system.

In the NB-LTE system, the transmission band of the NB-SS is restricted by the RF capability of an NB-LTE UE. That is, the transmission band of the NB-SS cannot exceed the RF capability of the NB-LTE UE. The NB-SS should be transmitted in a band narrower than or equal to the RF capability of the corresponding NB-LTE UE in order to make sure that the NB-SS is received by the NB-LTE UE. For simplicity, embodiments of the present invention will be described for an exemplary case where the RF capability of the NB-LTE UE is 200 kHz. Since the RF capability of the NB-LTE UE is 200 kHz, the NB-SS should be transmitted within 200 kHz. Additionally, considering that the channel raster is 100 kHz, the center frequencies of the band in which the NB-SS is transmitted are preferably multiples of 100 kHz. Considering a guard band in transmission of a DL signal, an interval at which significant information is transmitted in the NB-LTE system may be 180 kHz. 180 kHz is a frequency band that one physical resource block (PRB) defined in the current LTE system has and consists of 12 subcarriers in consideration of spacing of subcarriers of 15 kHz. On the assumption that the NB-LTE system should coexist with the LTE system and 100 kHz is maintained as the channel raster of the UE, the positions at which the NB-SS is allowed to be transmitted are very restrictive.

The following table shows channel bandwidths supported in the LTE system and the number of RBs NRB for each channel bandwidth. That is, the following table shows transmission bandwidth configurations NRB within the E-UTRA channel bandwidths.

TABLE 7

| Channel bandwidth BW$_{channel}$ [MHz] | 1.4 | 3 | 5 | 10 | 15 | 20 |
|---|---|---|---|---|---|---|
| Transmission bandwidth configuration N$_{RB}$ | 6 | 15 | 25 | 50 | 75 | 100 |

As shown in Table 7, the LTE system supports 1.4, 3, 5, 10, 15, and 20 MHz, and each band may be defined with the number of PRBs whose width is 180 kHz.

The following table shows the size of a band in which information is actually carried and transmitted and a corresponding channel bandwidth of the LTE system, namely the size of a guard band which is not used for actual transmission of the information within the system bandwidth.

TABLE 8

| Channel bandwidth | Number of RBs | Guard band | Guard band/2 |
|---|---|---|---|
| 1.4 MHz | 6 RBs = 1080 kHz | 320 kHz | 160 kHz |
| 3 MHz | 15 RBs = 2700 kHz | 300 kHz | 150 kHz |
| 5 MHz | 25 RBs = 4500 kHz | 500 kHz | 250 kHz |
| 10 MHz | 50 RBs = 9000 kHz | 1000 kHz | 400 kHz |
| 15 MHz | 75 RBs = 13500 kHz | 1500 kHz | 750 kHz |
| 20 MHz | 100 RBs = 18000 kHz | 2000 kHz | 1000 kHz |

Since the NB-IoT should be supported within the legacy LTE cell, the 6 center RBs of the LTE cell are preferably not used as PRBs for the NB-IoT in order to reduce influence on the PSS/SSS/PBCH of the legacy LTE cell. In this case, all RBs within 1.4 MHz may have PSS/SSS/PBCH, and thus NB-IoT may not be supported on the LTE cell of 1.4 MHz. Considering influence on the legacy PSS/SSS/PBCH and the number of RBs included in the channel bandwidth, the channel raster and center frequencies of the LTE system, the following PRB(s) may be used for transmission of the NB-SS/NB-PBCH for each LTE system bandwidth.

TABLE 9

| LTE system bandwidth | 1.4 MHz | 3 MHz | 5 MHz | 10 MHz | 15 MHz | 20 MHz |
|---|---|---|---|---|---|---|
| PRB indices for NPSS/NSSS | — | 2, 12 | 2, 7, 17, 22 | 4, 9, 14, 19, 30, 35, 40, 45 | 2, 7, 12, 17, 22, 27, 32, 42, 47, 52, 57, 62, 67, 72 | 4, 9, 14, 19, 24, 34, 39, 44, 55, 60, 65, 70, 75, 80, 85, 90, 95 |

In the following description, a frequency band of the size of one RB having a synchronization signal and broadcast transmission (e.g., PBCH, SIB 1, etc.) for NB-IoT will be referred to as an NB-IoT anchor carrier or an NB-IoT anchor PRB, and a frequency band of the size of one RB which may be used for unicast transmission for a specific UE without synchronization signal and broadcast signal transmission will be referred to as an NB-IoT non-anchor carrier or an NB-IoT non-anchor PRB. For the in-band NB-IoT operating in a channel band of the LTE cell, PRB(s) shown in Table 9 are candidate PRB(s) which may serve as the NB-IoT anchor carriers in the corresponding channel band.

If the NB-IoT UE and the MTC UE operate in the same cell, the narrowband region in which the NB-IoT UE operates may overlap with the narrowband region in which the MTC UE operates. For a cell having a system bandwidth which is not large, the number of narrowbands present in the cell is not large. In addition, since the NPSS/NSSS is transmitted through a frequency region positioned on the channel raster for cell search, it is difficult for the eNB to flexibly adjust the position of the frequency. Moreover, narrowbands for MTC may be pre-determined. Accordingly, it may be difficult for the MTC UE and the NB-IoT UE to always use different frequency regions, and a collision/ multiplexing issue may be raised between the NB-IoT channel and the MTC channel.

The network or eNB may adjust the MTC channel and the NB-IoT channel through scheduling such that collision does not occur between the MTC channel and the NB-IoT channel. However, it is expected that there will be large numbers of devices associated with the MTC and NB-IoT. Preventing collision between MTC and NB-IoT for large numbers of devices using only scheduling is limited.

<A. Collision with NB-PSS/NB-SSS>

In this section, a method of preventing collision between a channel for the MTC UE and an NB-PSS/NB-SSS for the NB-IoT UE will be described.

Method 1: Transmission of the MTC Channel is not Performed in the Entire Resource Region in which the NB-PSS/NB-SSS is Transmittable.

Whether or not to perform an NB-IoT service in a cell may be configured by the eNB. Such configuration may be transmitted to the UE through, for example, a PBCH or SIB (for MTC UEs), RRC, or the like. The UE may perform the operation of Method 1 only when the UE is informed that NB-IoT operates in the corresponding cell according to the configuration.

In particular, the MTC UE may assume that the MTC downlink channel is not transmitted on any of the resources on which the NB-PSS/NB-SSS is transmittable.

Resources on which the NB-PSS/NB-SSS is transmittable may refer to the entire region of NB-IoT narrowband(s) positioned on the channel raster on which the NB-IoT UE performs cell search. For example, all NB-IoT anchor PRB candidates present within the corresponding channel band may correspond to resources on which the NB-PSS/NB-SSS is transmittable.

Alternatively, the resources on which the NB-PSS/NB-SSS is transmittable may refer to subframe(s) in which the NB-PSS/NB-SSS is transmitted within all NB-IoT narrowbands (or a frequency region) positioned on the channel raster at which the NB-IoT UE performs cell search. If the system frame number applied to the NB-IoT anchor PRB is different from the system frame number applied to the LTE cell or if a subframe having the NB-PSS/NB-SSS is different from the existing PSS/SSS subframe, a UE that does not support NB-IoT or a UE for which NB-IoT is not configured may not recognize which subframe has the NB-PSS/NB-SSS. Accordingly, if the MTC UE does not recognize the subframe(s) having the NB-PSS/NB-SSS, information about the NB-PSS/NB-SSS subframe having the NB-PSS/NB-SSS may be provided to the UE.

The MTC UE or a UE which is not the NB-IoT UE may assume that an (MTC) downlink or uplink channel having resources overlapping with the NB-IoT anchor PRB candidate(s) is not transmitted in subframe(s) having the NB-PSS/NB-SSS, but is postponed or dropped. Postponing channel transmission means that, when a specific channel is repeated and transmitted through multiple subframes, transmission of the specific channel is neither performed in a corresponding subframe, nor counted as a repetition. Dropping channel transmission means that when a specific channel is repeated and transmitted through multiple subframes, transmission of the channel is not performed in the corresponding subframe, but is counted in the number of repetitions.

Figure 7:
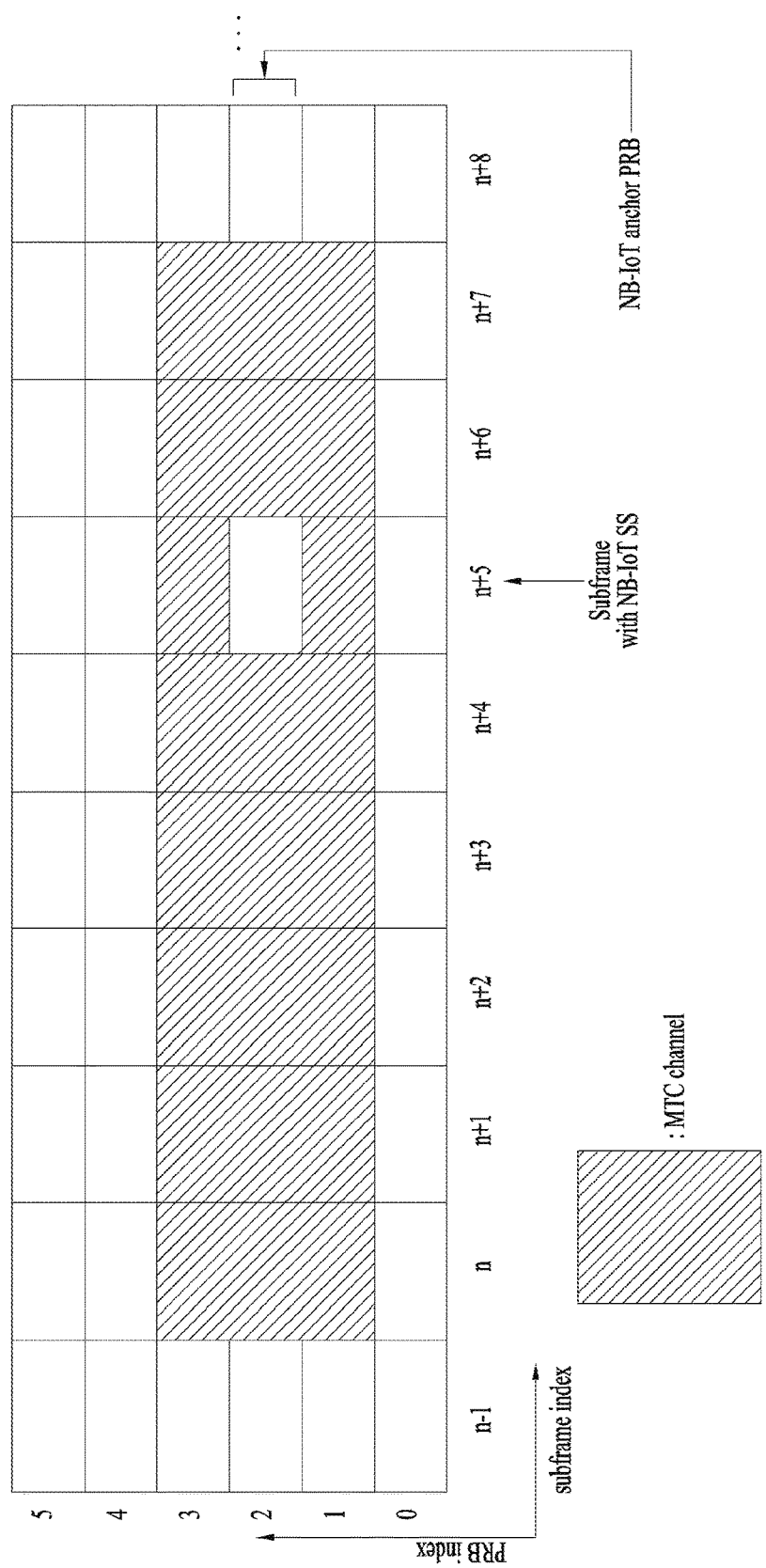
FIG. 7 illustrates transmitting/receiving a signal which is not an NB-IoT signal in a wireless communication system supporting NB-IoT according to an embodiment of the present invention.

Alternatively, PRB(s) corresponding to NB-IoT anchor PRB candidate(s) in the (MTC) downlink or uplink channel in the subframe(s) having the NB-PSS/NB-SSS may be punctured. FIG. 7 illustrates transmitting/receiving a signal which is not an NB-IOT signal in a wireless communication system supporting NB-IoT according to an embodiment of the present invention. The MTC UE or a UE which is not an NB-IoT UE may puncture PRB(s) corresponding to the NB-IoT anchor PRB candidate(s) having the NB-PSS/NB-SSS. For example, referring to FIG. 7, when an MTC channel is allocated so as to be transmitted using PRB1 to PRB3 in each of multiple subframes from subframe n to subframe n+7, the transmitter of the MTC channel maps the MTC channel to PRB1 to PRB3 in each of the subframes, and then transmits the MTC channel using PRB1 to PRB3. If the PRB2 is an NB-IoT anchor candidate, and the subframe n+5 is an NB-PSS/NB-SSS subframe having the NB-PSS/NB-SSS, the transmitter does not transmit a portion of the signal of the MTC channel mapped to PRB2 in the signal of the MTC channel mapped to PRB1 to PRB3 in subframe n+5. That is, the transmitter transmits the MTC channel in subframe n+5, puncturing the MTC channel on PRB2. The receiver of the MTC channel receives, demodulates, or decodes the MTC channel, assuming that the portion of the MTC channel mapped to PRB2 is not transmitted in subframe n+5, namely the portion is punctured. In other words, the MTC channel in subframe n+5 is counted in the number of repetitions configured for the MTC channel, but the portion thereof mapped to PRB2 is not transmitted.

For reference, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

Method 2: Transmission of the MTC Channel is not Performed in a Resource Region in which the NB-PSS/NB-SSS is Transmittable within an NB-IoT Operation Narrowband (i.e., PRB) Region.

An eNB may configure a region of narrowbands (a frequency region) in which the NB-IoT UE operates, through a PBCH or SIB (for MTC UEs). For example, if the narrowband in which NB-IoT cell operates is 1 PRB, the positions of all NB-IoT anchor PRB candidate(s) in the cell to which the narrowband(s) for MTC belong may be notified to the MTC UE. The MTC UE may assume that an (MTC) downlink or uplink channel is not transmitted in the entire resource region in which the NB-PSS/NB-SSS is transmittable in the narrowbands (frequency region) configured by the eNB. In contrast with Method 1 in which the eNB signals only whether or not NB-IoT has been configured, Method 2 may allow the eNB to signal NB-IoT anchor PRB candidate(s) to non-NB-IoT UE(s).

The resources on which the NB-PSS/SSS is transmittable may refer to the entire NB-IoT narrowband region positioned on the channel raster at which the UE performs cell search. For example, all NB-IoT anchor PRB candidates present in the channel band may correspond to the resources on which the NB-PSS and/NB-SSS is transmittable. If the UE does not recognize PRBs which are NB-IoT anchor PRB candidates, the eNB may provide the UE with information about the NB-IoT anchor PRB candidates.

Alternatively, the resources on which the NB-PSS/SSS is transmittable may refer to a subframe region in which the NB-PSS/NB-SSS is transmitted in all NB-IoT narrowbands (or frequency regions) positioned at the channel raster at which the UE performs cell search. If the UE does not recognize subframe(s) having the NB-PSS/NB-SSS, information about the NB-PSS/NB-SSS subframes having the NB-PSS and/NB-SSS may be provided to the UE.

The MTC UE or a UE which is not the NB-IoT UE may assume that an (MTC) downlink or uplink channel having a resource overlapping NB-IoT anchor PRB candidate(s) having the NB-PSS/NB-SSS is not transmitted in the subframe(s) having NB-PSS/NB-SSS, but is postponed or dropped. Postponing channel transmission means that when a specific channel is repeated and transmitted through multiple subframes, transmission on the specific channel is neither performed in the corresponding subframe, nor counted in the number of repetitions. Dropping channel transmission means that when a specific channel is repeated and transmitted through multiple subframes, transmission of the channel is not performed in the corresponding subframe, but is counted in the number of repetitions. Alternatively, PRB(s) corresponding to NB-IoT anchor PRB candidate(s) in the (MTC) downlink or uplink channel may be punctured in the subframe(s) having the NB-PSS/NB-SSS.

Method 3: Transmission of the MTC Channel is not Performed in a Resource Region in which the NB-PSS/NB-SSS is Transmittable in an NB-PSS/NB-SSS Transmission Narrowband (i.e., PRB) Region.

The eNB may configure a narrowband(s) region (frequency region) in which the NB-PSS/PNB-SSS is transmittable, through a PBCH or SIB (for MTC UEs), RRC, or the like. In contrast with Method 1, in which eNB signals only whether the NB-IoT is configured, and Method 2, in which the eNB signals NB-IoT anchor PRB candidate(s), Method 3 may allow the eNB to signal NB-IoT anchor PRB(s) which are actually used for transmission of an NB-IoT SS (among NB-IoT anchor PRB candidates).

The MTC UE may assume that an (MTC) downlink or uplink channel is not transmitted in the narrowbands (frequency region) configured by the eNB. For example, the eNB may provide the UE with information about PRB(s) which are actually used for transmission of an NB-PSS/NB-SSS among NB-IoT anchor PRB candidates present in the corresponding channel band.

Alternatively, the MTC UE may assume that an (MTC) downlink or uplink channel is not transmitted in a subframe resource region in which NB-PSS/NB-SSS is transmittable in the narrowbands (frequency region) configured by the eNB. In this case, the UE may assume that an (MTC) downlink or uplink channel is not transmitted in the subframe resource region, but is postponed or dropped. Postponing channel transmission means that when a specific channel is repeated and transmitted through multiple subframes, transmission of the specific channel is neither performed in a corresponding subframe, nor counted in the number of repetitions. Dropping channel transmission means that when a specific channel is repeated and transmitted through multiple subframes, transmission of the channel is not performed in the corresponding subframes, but is counted in the number of repetitions.

The MTC UE or a UE which is not the NB-IoT UE may puncture PRB(s) configured as NB-IoT anchor PRB in subframe(s) having the NB-PSS/NB-SSS. For example, referring to FIG. 7, when an MTC channel is allocated so as to be transmitted using PRB1 to PRB3 in each of multiple subframes from subframe n to subframe n+7, the transmitter of the MTC channel maps the MTC channel to PRB1 to PRB3 in each of the subframes, and then transmits the MTC channel using PRB1 to PRB3. If the PRB2 is signaled as an NB-IoT anchor candidate, and the subframe n+5 is an NB-PSS/NB-SSS subframe having an NB-PSS/NB-SSS, the transmitter does not transmit a signal mapped to PRB2 among the signals of the MTC channel mapped to PRB1 to PRB3 in subframe n+5. That is, the transmitter transmits the MTC channel in the subframe n+5 by puncturing the MTC channel on PRB2. The receiver of the MTC channel receives, demodulates, or decodes the MTC channel in subframe n+5, assuming that a portion of the MTC channel mapped to PRB2 is not transmitted, namely the portion is punctured. In other words, the MTC channel in subframe n+5 is counted in the number of repetitions configured for the MTC channel, but only the portion mapped to PRB2 is not transmitted.

Regarding Methods 1, 2 and 3, while FIG. 7 illustrates a case where one NB-IoT anchor PRB (candidate) overlaps an MTC channel resource, all NB-IoT anchor PRBs (candidates) overlapping the MTC channel resource in each NB-PSS/NB-SSS subframe may be punctured when multiple NB-IoT anchor PRB candidates or multiple NB-IoT anchor PRBs overlap the MTC channel resource.

<B. Collision with SIB/PRACH Resource>

In this section, a method of preventing collision between a signal transmitted/received by the MTC UE and NB-IoT UE and a resource region reserved for SIB/PRACH transmission of the counterpart or a resource region in which the SIB/PRACH is transmittable.

To prevent collision between the MTC channel and the NB-IoT SIB/PRACH, the MTC UE may assume that the MTC channel is not transmitted in a resource region in which the SIB/PRACH for the NB-IoT UE is transmittable. The MTC UE may assume that the MTC channel is not transmitted in a subframe region having resources on which the SIB/PRACH for the NB-IoT UE is transmittable, but is postponed or dropped. Alternatively, the UE may assume that a resource on which the SIB/PRACH for the NB-IoT UE is transmittable is punctured in the corresponding subframe region. Postponing channel transmission means that when a specific channel is repeated and transmitted through multiple subframes, transmission of the specific channel is neither performed in a corresponding subframe, nor counted in the number of repetitions. Dropping channel transmission means that when a specific channel is repeated and transmitted through multiple subframes, transmission of the channel is not performed in the corresponding subframes, but is counted in the number of repetitions. Similarly, the NB-IoT UE may assume that the NB-IoT channel is not transmitted in the resource region in which the SIB/PRACH for the MTC UE is transmittable. The NB-IoT UE may assume that the NB-IoT channel is not transmitted in a subframe region having a resource on which the SIB/PRACH for the MTC UE is transmittable, but is postponed or dropped.

The MTC UE may recognize the resource region in which the SIB/PRACH for the NB-IoT is transmittable in the following manner. The method of the NB-IoT UE recognizing the resource region in which the SIB/PRACH for the MTC is transmittable may be applied by switching NB-IoT and MTC.

Method 1: Configuration of Supportability of the NB-IoT in a Cell

The eNB may configure, for the MTC UE, supportability of the NB-IoT in a cell through a PBCH, SIB, RRC, or the like. Once the eNB configures NB-IoT to be supported in the cell for the MTC UE, the MTC UE may assume that the MTC channel is not transmitted in the entire subframe/PRB region in which the SIB/PRACH of NB-IoT is transmittable.

Method 2: Configuration of Narrowband/Frequency Resource Information for NB-IoT

The eNB may configure, for the MTC UE, information about an uplink and/or downlink narrowband or frequency resource used for transmission/reception of a channel to/from an NB-IoT UE in the corresponding cell, through the PBCH, SIB, RRC, or the like. Once the MTC UE receives information about an operation frequency for the NB-IoT UE in the cell from the eNB, it may assume that the MTC channel is not transmitted in the entire subframe/PRB region in which the SIB/PRACH of NB-IoT is transmittable within the corresponding frequency region. Once the UE recognizes the operation frequency information for the NB-IoT UE, the UE may recognize the position of a frequency and/or subframe resource on which the SIB/PRACH is transmittable. For example, the frequency and/or subframe resource on which the SIB/PRACH is transmittable may be determined within the operation frequencies of the NB-IoT UE by a predetermined equation/pattern.

Method 3: Configuration of SIB/PRACH Transmission Narrowband/Frequency Resource Information for NB-IoT The eNB may configure, for the MTC UE, information about an uplink and/or downlink narrowband or frequency resource used for SIB/PRACH transmission to the NB-IoT UE in the corresponding cell. The MTC UE may assume that the MTC channel is not transmitted in the entire subframe region in which the SIB/PRACH of NB-IoT is transmittable in the corresponding frequency region.

Method 4: Configuration of SIB/PRACH Transmission Resource Information for NB-IoT The eNB may configure, for the MTC UE, information about an uplink and/or downlink narrowband or frequency resource and subframe position information used for SIB/PRACH transmission to the NB-IoT UE in the corresponding cell. The MTC may assume that the MTC channel is not transmitted in the corresponding frequency region and subframe region.

<C. Control and Data Channel>

In this section, a technique of transmitting/receiving a control/data channel is proposed to minimize collision with a channel of the counterpart when the MTC UE and the NB-IoT PRB transmit and receive the control/data channel. In this embodiment, the PDCCH and PDSCH for the MTC UE are called MPDCCH and MPDSCH, respectively, and the PDCCH and PDSCH for the NB-IoT UE are called NPDCCH and NPDSCH, respectively.

The MTC UE may monitor an MPDCCH invariably using 6 PRBs. For example, in a common search space (CSS) in which a PDCCH for paging is transmittable (hereinafter, paging CSS), the MPDCCH is invariably transmitted on 6 PRBs. In other words, MPDCCH candidate(s) are decoded on the assumption that the MPDCCH is transmittable over 6 PRBs. In this case, if a channel for the NB-IoT UE is transmitted on some PRBs of the 6 PRBs, collision will always occur between the MPDCCH and the corresponding channel. For the MTC SIB, the MPDCCH is transmitted through 6 PRBs. In this case, if a channel for the NB-IoT UE is transmitted on some of the 6 PRBs, collision will always occur between the MPDCCH and the corresponding channel.

Accordingly, the present invention proposes that a search space in which DCI for scheduling paging is transmitted (i.e., the paging CSS) and/or a PDSCH for transmitting a paging message be configured on fewer than 6 PRBs to allow multiplexing between the MTC channel and the NB-IoT channel within an MTC narrowband. For example, the search space in which DCI for scheduling paging is transmitted and/or a PRB region of the PDSCH for transmitting a paging message may be configured through an SIB.

In the embodiments of the present invention described above, the MTC narrowband may refer to, for example, a frequency resource of up to 6 PRBs, and the NB-IoT narrowband may refer to a frequency resource of one PRB.

Figure 8:
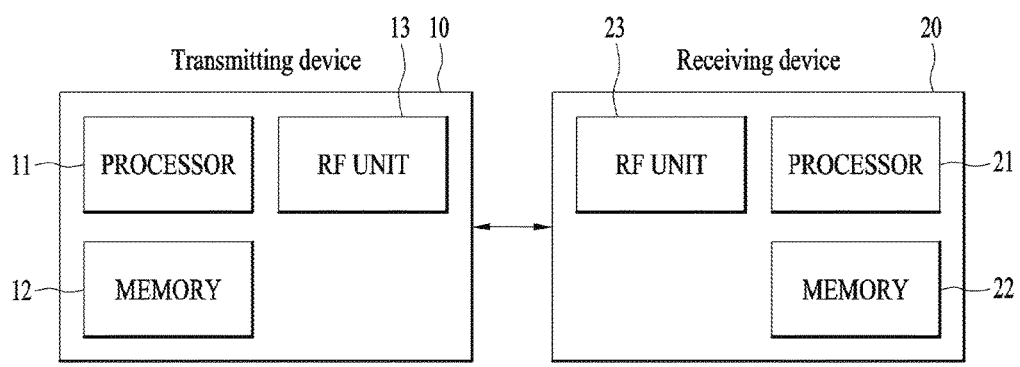
FIG. 8 is a block diagram illustrating elements of a transmitting device 10 and a receiving device 20 for implementing the present invention.

FIG. 8 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The processor of the eNB of the present invention may provide an MTC service and NB-IoT service according to one of the proposals of the present invention. The processor of the eNB may control the RF unit of the eNB to transmit an NB BSS/NB-SSS on each of the IoT anchor PRBs. The processor of the eNB may control the RF unit of the eNB to transmit information about the NB-IoT anchor PRB(s) (candidate) and/or information about subframe(s) having the NB-DSS/NB-SSS to the MTC UE.

The processor of the eNB may be configured to schedule a downlink channel or uplink channel of the MTC UE within a limited bandwidth (e.g., 6 RBs). The processor of the eNB may configure or schedule a channel of the MTC UE such that the channel of the MTC UE is repeatedly transmitted/received in each of a plurality of subframes. The processor of the eNB may control the RF unit of the eNB to transmit information about a narrowband in which the channel of the MTC UE may be allocated or scheduled and/or information about subframe(s) to which repetition of the MTC UE is applicable, and/or information about the (maximum) number of repetitions. The processor of the eNB may control the RF unit of the eNB to transmit a DL grant carrying scheduling information about the MTC downlink channel or an UL grant carrying scheduling information about the MTC uplink channel. The processor of the eNB may schedule transmission of the MTC downlink channel according to the DL grant or reception of the MTC uplink channel according to the UL grant.

The processor of the eNB may puncture the MTC channel on the NB-IoT anchor PRB (candidate) according to the information about the NB-IoT anchor PRB (candidate) and/or information about the subframe(s) having the NB-PSS/NB-SSS if the resource of the MTC channel collides with the NB-IoT anchor PRB (candidate) in a subframe having the NB-PSS/NB-SSS on the NB-IoT anchor PRB (candidate). For example, the eNB may control the eNB RF unit to transmit the MTC channel with an NB-IoT anchor PRB (candidate) punctured in a subframe which has the NB-PSS/NB-SSS on the NB-IoT anchor PRB (candidate). If collision occurs between the resource of the MTC downlink channel and the NB-IoT anchor PRB (candidate) in a subframe having the NB-BSS/NB-SSS, the eNB processor may puncture the MTC downlink channel on the NB-IoT anchor PRB (candidate) according to the information about the NB-IoT anchor PRB (candidate) and/or information about the subframe(s) having the NB-PSS/NB-SSS. The eNB may control the eNB RF unit to transmit the MTC downlink channel which is punctured on the NB-IoT anchor PRB (candidate). As another example, if collision occurs between the resource of the MTC uplink channel and the NB-IoT anchor PRB (candidate) in a subframe having the NB-PSS/NB-SSS on the NB-IoT anchor PRB (candidate), the eNB processor may assume that the MTC uplink channel is punctured on the NB-IoT anchor PRB candidate and transmitted in the subframe(s) having the NB-PSS/NB-SSS according to the information about the NB-IoT anchor PRB (candidate) and/or information about the subframe(s) having the NB-PSS/NB-SSS. The eNB processor may control the eNB RF unit to receive the MTC uplink channel which is punctured on the NB-IoT anchor PRB (candidate) in subframes having the NB-PSS/NB-SSS on the NB-IoT anchor PRB (candidate). The eNB processor may demodulate or decode the MTC uplink channel, assuming that the MTC uplink channel received by the eNB RF unit has been transmitted with the NB-IoT anchor PRB (candidate) punctured in the subframes having the NB-PSS/NB-SSS on the NB-IoT anchor PRB (candidate).

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method of transmitting a downlink signal by a base station in a wireless communication system, the method comprising:

in response to a transmission of a primary synchronization signal (PSS) or a secondary synchronization signal (SSS) for a narrowband Internet of Things (NB-loT) UE overlapping with a transmission of a first downlink channel for a Machine-Type Communications UE (MTC UE) in a first subframe:
- transmitting the PSS or the SSS for the NB-loT UE; and
- dropping the transmission of the first downlink channel for the MTC UE in the first subframe, and in response to a transmission of a physical random access channel (PRACH) for the MTC UE overlapping with a transmission of a second downlink channel for the NB-loT UE in a second subframe:
- transmitting the PRACH for the MTC UE in the second subframe; and
- dropping the transmission of the second downlink channel for the NB-loT UE in the second subframe.

2. The method according to claim 1, wherein the PRACH for the MTC UE is transmitted on six physical resource blocks (PRBs).

3. The method according to claim 1, wherein the PSS or the SSS for the NB-IoT UE is transmitted on a physical resource block (PRB).

4. A base station for transmitting a downlink signal in a wireless communication system, the base station comprising: a radio frequency (RF) unit; and a processor configured to control the RF unit, wherein the processor is configured to control the RF unit to:

in response to a transmission of a primary synchronization signal (PSS) or a secondary synchronization signal (SSS) for a narrowband Internet of Things (NB-loT) UE overlapping with a transmission of a first downlink channel for a Machine-Type Communications UE (MTC UE) in a first subframe:
- transmit the PSS or the SSS for the NB-loT UE in the first subframe; and
- drop the transmission of the first downlink channel for the MTC UE in the subframe, and in response to a transmission of a physical random access channel (PRACH) for the MTC UE overlapping with a transmission of a second downlink channel for the NB-loT UE in a second subframe:
- transmit the PRACH for the MTC UE in the second subframe; and
- drop the transmission of the second downlink channel for the NB-loT UE in the second subframe.

5. The base station according to claim 4, wherein the PRACH for the MTC UE is transmitted on six physical resource blocks (PRBs).

6. The base station according to claim 4, wherein the PSS or the SSS for the NB-IoT UE is transmitted on a physical resource block (PRB).

* * * * *